H. J. BRENNECKE.
FLEXIBLY CONNECTED LENSES.
APPLICATION FILED AUG. 6, 1915.

1,193,232.

Patented Aug. 1, 1916.

Witness:
R. Bauerle

Inventor
Herman J. Brennecke
by
Atty.

UNITED STATES PATENT OFFICE.

HERMAN J. BRENNECKE, OF CHICAGO, ILLINOIS, ASSIGNOR OF ONE-HALF TO ROBERT MALCOLM, OF CHICAGO, ILLINOIS.

FLEXIBLY-CONNECTED LENSES.

1,193,232.  Specification of Letters Patent.  Patented Aug. 1, 1916.

Application filed August 6, 1915. Serial No. 43,934.

*To all whom it may concern:*

Be it known that I, HERMAN J. BRENNECKE, a citizen of the United States, residing at Chicago, in the county of Cook and State of Illinois, have invented certain new and useful Improvements in Flexibly-Connected Lenses, of which the following is a specification.

My invention relates to eye glasses or goggles, and has particular reference to the attainment of the greatest possible simplicity combined with pleasing novelty of construction, which are the objects of the present invention.

Figure 1:
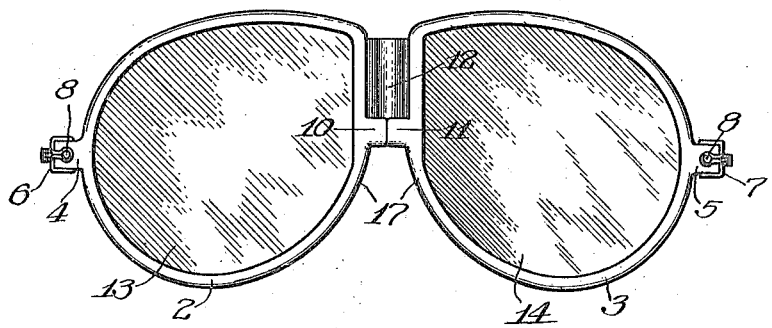
Figure 2:
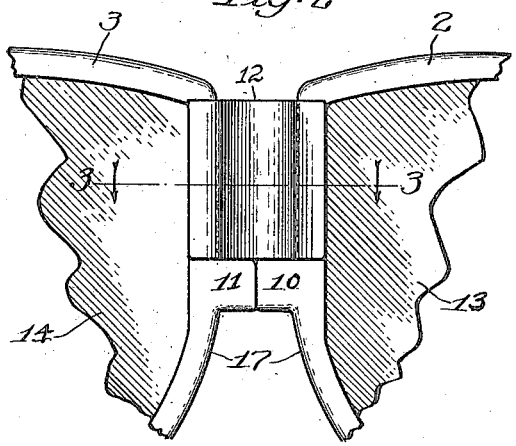

In the drawing—Figure 1 is an outside, or the exposed side, view of a pair of goggles embodying my invention. Fig. 2 is an enlarged side view of same, the outer portions of the lenses being broken away.

In the two views 2 and 3 represent the edges of a pair of lenses, whether these edges are the naked edges of the lenses or rims of metal or celluloid attached to the naked edges. On the lenses, or their edges 2 and 3, are integral lug portions 4 and 5 on which temple fittings 6 and 7 fastened by screws 8 and 9 are mounted, and similar lug portions 10 and 11 which are arranged to form a nose-contacting portion, or nose-piece 17 as well as a divided bridge span which flexes to permit angular relative movement of the lenses. The space above the bridge and nose-piece formed by said lugs, is spanned by a curved and flexible strip 12 which is really a continuation of the aforementioned bridge with the additional function of holding the parts 10 and 11 together as substantially a single part and permitting the angular movement of the latter and of the lenses. If the edges 2 and 3 are celluloid the flexible strip 12 may also be of celluloid, thus closing the space between the lenses against dust and giving the lens-edges and their connections a uniform color and the appearance of a continuous, or non-flexible, structure. If the edges of the lenses are rims of rubber or celluloid the strip 12 may be vulcanized, or otherwise suitably secured, to form substantially an integral part of the rim or edges, in contradistinction to the usually more or less complicated and in appearance less pleasing connections.

Figure 3:
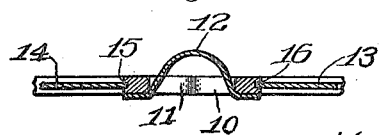

Fig. 3 shows the lenses 13 and 14 mounted in rims and sprung into grooves 15 and 16 formed in said rims. As shown in Fig. 2 the flexible strip 12 is on the rear faces of the rims, or of the lenses themselves when the latter have as parts thereof the lug portions 10 and 11. When attached to the rear of the rims the effect of the flexible strip is that of an inserted panel or graceful curvature. The outlines of this panel, or the boundary lines of the opening which it closes, may be varied in numerous fanciful ways without departing from the spirit of my invention or appreciably changing the cost or problem of construction, to meet the different tastes of users and their demands for novelty. The same is true of the nose contacting edges of the nose-piece portions 10, 11 and 17.

Having thus described my invention, I claim as new and desire to secure by Letters Patent—

1. A pair of lenses constructed and arranged to jointly form a nose piece, and a flexible connection for said lenses which closes the space therebetween above said nose-piece.

2. The combination of a pair of lenses having contacting portions which form a nose-piece and are angularly movable with said lenses, and a connection for said lenses which closes the space therebetween and permits angular movement.

3. A pair of lenses having exterior boundary lines which together form a nose-piece and a panel opening above said nose-piece, and a panel inserted in said opening, said panel forming a flexible connection for the lenses, and said flexible panel and the upper part of the nose-piece forming a connecting bridge between said lenses and connecting said lenses.

In testimony whereof I have hereunto set my hand.

HERMAN J. BRENNECKE.

Copies of this patent may be obtained for five cents each, by addressing the "Commissioner of Patents, Washington, D. C."